(12) United States Patent
Kim et al.

(10) Patent No.: US 9,655,187 B2
(45) Date of Patent: May 16, 2017

(54) CONTROL CIRCUIT FOR LED LIGHTING APPARATUS

(71) Applicant: SILICON WORKS CO., LTD., Daejeon-si (KR)

(72) Inventors: Yong Geun Kim, Suwon-si (KR); Ki Chul An, Daegu-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 0 days.

(21) Appl. No.: 15/014,485

(22) Filed: Feb. 3, 2016

(65) Prior Publication Data

US 2016/0227617 A1 Aug. 4, 2016

(30) Foreign Application Priority Data

Feb. 3, 2015 (KR) .................. 10-2015-0016491

(51) Int. Cl.
*H05B 37/00* (2006.01)
*H05B 33/08* (2006.01)

(52) U.S. Cl.
CPC ..... *H05B 33/0845* (2013.01); *H05B 33/0815* (2013.01)

(58) Field of Classification Search
CPC H05B 37/02; H05B 33/0845; H05B 33/0815; H05B 33/08
USPC .......... 315/291, 307, 209 R, DIG. 4
See application file for complete search history.

(56) References Cited

U.S. PATENT DOCUMENTS

| 8,415,890 | B2 | 4/2013 | Kang et al. | |
| 8,760,064 | B1* | 6/2014 | Yoon | H05B 33/0842 315/185 R |
| 9,192,002 | B2 | 11/2015 | Morales | |
| 2013/0141013 | A1* | 6/2013 | Kodama | F21K 9/56 315/294 |
| 2013/0241428 | A1* | 9/2013 | Takeda | H05B 33/0827 315/210 |

FOREIGN PATENT DOCUMENTS

| KR | 10-1012020 | 1/2011 |
| KR | 10-1230634 | 2/2013 |

* cited by examiner

*Primary Examiner* — Minh D A
(74) *Attorney, Agent, or Firm* — Kile Park Reed & Houtteman PLLC

(57) ABSTRACT

Disclosed is a control circuit of an LED lighting apparatus which is capable of improving power efficiency. The control circuit controls light emission of one or more LED groups in response to changes of a rectified voltage, and includes a current source configured to provide a primary current using a driving current outputted through a current path of a driver and a secondary current using a rectified current provided to a plurality of LED groups. Thus, the control circuit can perform a charging operation using a current provided from the current source, and provide a charge voltage to an additional device.

18 Claims, 3 Drawing Sheets

CONTROL CIRCUIT FOR LED LIGHTING APPARATUS

BACKGROUND

1. Technical Field

The present disclosure relates to an LED lighting apparatus, and more particularly, to a control circuit for an LED lighting apparatus, which is capable of improving power efficiency.

2. Related Art

A lighting apparatus is designed to use a light source which exhibits high light emission efficiency using a small amount of energy, in order to reduce energy consumption. Representative examples of a light source used in the lighting apparatus may include an LED.

The LED is different from other light sources in terms of various aspects such as energy consumption, lifetime, and light quality. However, since the LED is driven by a current, a lighting apparatus using the LED as a light source requires a large number of additional circuits for driving a current.

In order to solve the above-described problem, an AC direct-type lighting apparatus has been developed to provide an AC voltage to an LED. The lighting apparatus is configured to convert an AC voltage into a rectified voltage, and drive a current using the rectified voltage such that the LED emits light. The rectified voltage indicates a voltage obtained by full-wave rectifying an AC voltage. Since the lighting apparatus directly uses a rectified voltage without using an inductor and a capacitor, the lighting apparatus has a satisfactory power factor.

The lighting apparatus using LEDs includes a driver which provides a current path for a driving current in response to light emission based on the change of the rectified voltage. The lighting apparatus may further include an additional device for controlling a light emitting state, such as a dimming circuit or wireless module.

In this case, the additional device requires an operating voltage for operation. The additional device requires a constant voltage of 2V to 5V as the operating voltage.

The above-described lighting apparatus may use an external voltage or a voltage which is separately generated through a power supply, as the operating voltage of the additional device. When the lighting apparatus is configured to provide the operating voltage of the additional device, the power efficiency of the lighting apparatus is inevitably degraded.

Thus, there is a demand for the development of a lighting apparatus which is capable of reducing power consumption while having high power efficiency.

SUMMARY

Various embodiments are directed to a control circuit of an LED lighting apparatus, which provides an operating voltage of an additional device using a rectified voltage used for light emission, thereby improving power efficiency and reducing power consumption.

In an embodiment, there is provided a control circuit for an LED lighting apparatus, which controls light emission of one or more LED groups in response to changes of a rectified voltage. The control circuit may include: a driver configured to provide a current path corresponding to light emission of the one or more LED groups; and a primary current source configured to provide a primary current using a driving current of the current path. The control circuit may provide an operating voltage to an additional device using the primary current.

In another embodiment, there is provided a control circuit for an LED lighting apparatus, which controls light emission of one or more LED groups in response to changes of a rectified voltage. The control circuit may include: a driver configured to provide a current path corresponding to light emission of the one or more LED groups; and a current source configured to provide one or more of a primary current using a driving current of the current path and a secondary current using a rectified voltage provided to the one or more LED groups. The control circuit may provide an operating voltage to an additional device, using one or more of the primary current and the secondary current which are provided from the current source.

In another embodiment, there is provided a control circuit for an LED lighting apparatus, which controls light emission of one or more LED groups in response to changes of a rectified voltage. The control circuit may include: a current path formed in response to light emission of the one or more LED groups; and a primary current source configured to provide a primary current using a driving current of the current path. The control circuit may provide an operating voltage to an additional device, using the primary current.

DETAILED DESCRIPTION

Figure 1:
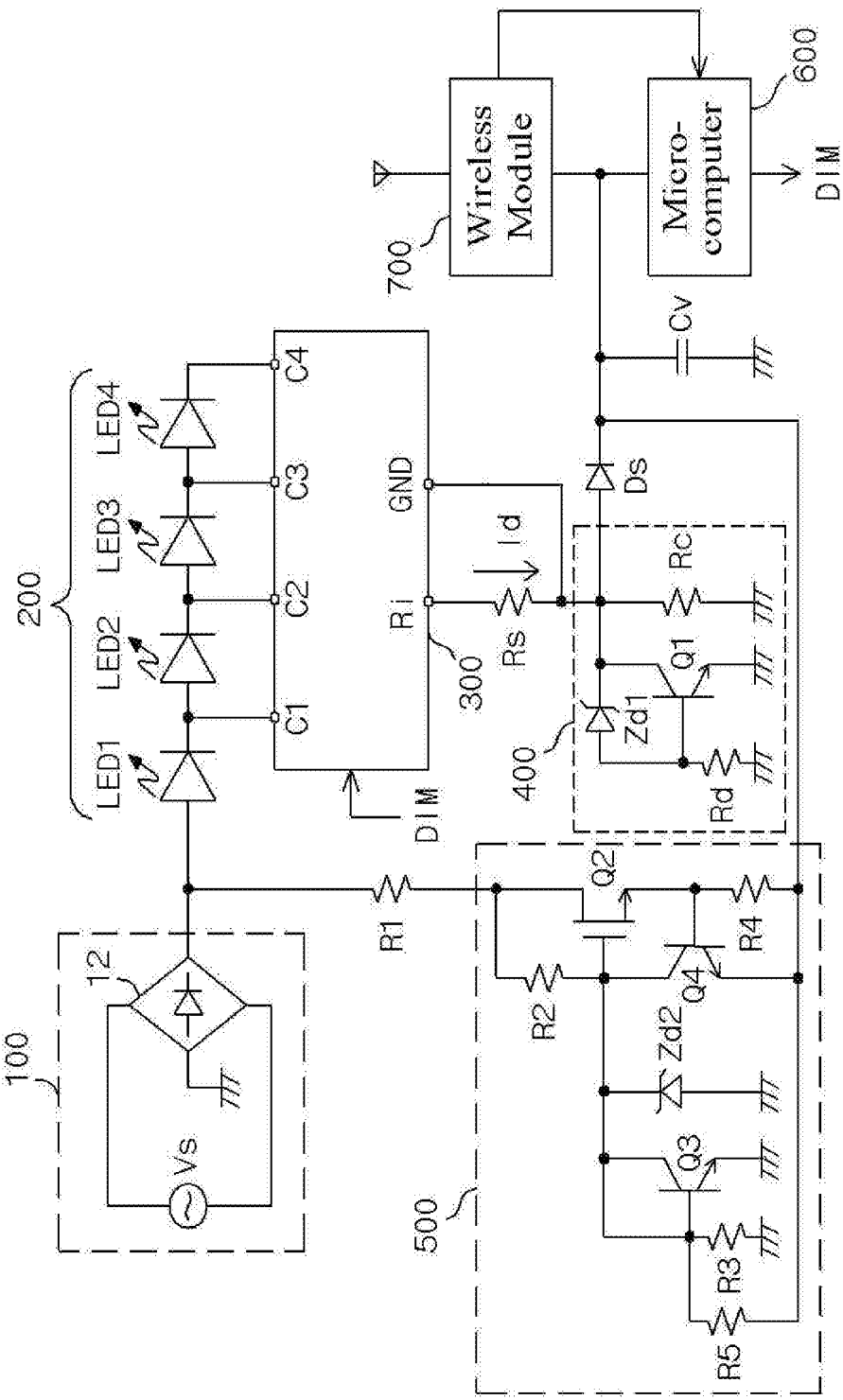
FIG. 1 is a circuit diagram illustrating a control circuit for an LED lighting apparatus according to an embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

A lighting apparatus according to an embodiment of the present invention may use a light source having the light emitting characteristic of semiconductor which converts electrical energy into light energy, and the light source having the light emitting characteristic of semiconductor may include an LED.

The lighting apparatus according to the embodiment of the present invention may include an AC direct-type LED lighting apparatus. The AC direct-type LED lighting apparatus controls an LED to emit light, using a reflected voltage obtained by converting an AC voltage. As described above, the rectified voltage has a waveform obtained by full-wave rectifying a square-wave AC voltage. The rectified voltage has a ripple in which the voltage level rises and falls on a basis of the half cycle of the commercial AC voltage. Furthermore, a current which is provided to an LED in response to the rectified voltage obtained by converting the AC voltage is referred to as a rectified current.

Thus, as illustrated in FIG. 1, a lighting unit 200 including LEDs is configured to emit light using an AC voltage, and a driver 300 is configured to provide a current path in response to light emission of the lighting unit 200.

More specifically, the control circuit for the LED lighting apparatus according to the embedment of the present invention includes a power supply unit 100, a lighting unit 200, a driver 300, a sensing resistor Rs, a primary current source 400, and a secondary current source 500.

The control circuit according to the embodiment of the present invention may include a charging element Cv which is charged by one or more of a primary current of the primary current source 400 and a secondary current of the secondary current source 500, and configured to provide a charge voltage to an additional device such that the charge voltage can be used as an operating voltage.

The charging element Cv may include a charging capacitor, and the additional device may include a microcomputer 600 and a wireless module 700. The microcomputer 600 provides a dimming control signal DIM to the driver 300 in response to a dimming signal, and the wireless module 700 receives the dimming signal which is wirelessly transmitted, and transmits the dimming signal to the microcomputer 600. The additional device may be configured inside or outside the LED lighting apparatus.

The power supply unit 100 is configured to rectify an AC voltage of an AC power source VAC and output the rectified voltage. The power supply unit 100 may include the AC power source VAC configured to provide an AC voltage and a rectifier circuit 12 configured to rectify the AC voltage and output the rectified voltage.

The AC voltage source VAC may include a commercial power source.

The rectifier circuit 12 outputs a rectified voltage. In the embodiment of the present invention, a rise or fall of the rectified voltage may indicate a rise or fall of a ripple of the rectified voltage. The current outputted from the rectifier circuit 12 in response to the rise or fall of the rectified voltage corresponds to the rectified current.

The lighting unit 200 includes LEDs divided into a plurality of LED groups. The LED groups of the lighting unit 200 may be sequentially turned on or off in response to the rises or falls of the rectified voltage provided from the power supply unit 100.

FIG. 1 illustrates that the lighting unit 200 includes four LED groups LED1 to LED4. Each of the LED groups LED1 to LED4 includes one or more LEDs. For convenience of description, one or more LEDs may be represented by one diode symbol.

The driver 300 is configured to compare a sensing voltage to reference voltages corresponding to the respective LED groups LED1 to LED4, and provide a current path for the LED groups LED1 to LED4.

The driver 300 has channel terminals C1 to C4 connected to the respective output terminals of the LED groups LED1 to LED4, a ground terminal GND for connection to the ground, a sensing terminal Ri connected to a sensing resistor Rs, and a dimming terminal configured to receive the dimming control signal DIM. The driver 300 controls changes of the current paths between the channel terminals C1 to C4 and the sensing terminal Ri.

The sensing resistor Rs is connected between the driver 300 and the primary current source 400, and the ground terminal GND of the driver 300 is connected to a node between the primary current source 400 and the sensing resistor Rs. Through the above-described configuration, the sensing resistor Rs provides a sensing voltage corresponding to the light emitting states of the LED groups LED1 to LED4, and relays the primary current of the primary current source 400 such that the primary current source 400 is connected in series to a current path within the driver 300.

The current flowing through the sensing resistor Rs may be changed according to the light emitting states of the LED groups LED1 to LED4 of the lighting unit 200, and defined as a driving current Id.

The primary current source 400 is connected in series to the current path of the driver 300 through the sensing resistor Rs such that a divided voltage is formed by the rectified voltage. The primary current source 400 is configured to regulate the divided voltage to a predetermined voltage or less, and provide a primary current corresponding to the divided voltage.

The primary current source 400 includes an output resistor Rc connected in series to the current path of the driver 300 through the sensing resistor Rs. Through the above-described configuration, the driving current Id may be introduced into the output resistor Rc. As a result, the divided voltage by the rectified voltage is formed in the output resistor Rc.

The primary current source 400 includes a voltage retention circuit which regulates the divided voltage of the output resistor Rc to the predetermined level or less.

The voltage retention circuit may be configured to control the level of the divided voltage by regulating the current of the output resistor Rc using a Zener diode Zd1. For this operation, the voltage retention circuit may include an NPN bipolar transistor Q1, a Zener diode Zd1, and a resistor Rd. The NPN bipolar transistor Q1 is connected in parallel to the output resistor Rc and configured to control a current flowing through the output resistor Rc, the resistor Rd is connected between the ground and the base of the NPN bipolar transistor Q1, and the Zener diode Zd1 is configured to control the base voltage of the NPN bipolar transistor Q1 such that the base voltage does not exceed a preset level.

When the divided voltage applied to the output resistor Rc rises to a predetermined level or more, the NPN bipolar transistor Q1 distributes a current transmitted to the output resistor Rc to the ground due to the change of the base voltage. As a result, the voltage retention circuit regulates the divided voltage applied to the output resistor Rc such that the divided voltage does not rise to the predetermined level or more.

According to the above-described configuration, the primary current source 400 may provide a primary current corresponding to the divided voltage applied to the output resistor Rc, to the charging element Cv. The primary current source 400 may be configured to provide a primary current to the charging element Cv through a diode Ds configured in the forward direction.

The secondary current source 500 provides a secondary current obtained by the rectified voltage to the additional device, when an operating voltage supplied to the additional device is lowered to the predetermined level or less. That is, when the operating voltage supplied to the additional device is lowered to the predetermined level or less, the secondary current source 500 provides a secondary current obtained by controlling the rectified current by the rectified voltage to the charging element Cv, and compensates for the charge voltage, thereby stabilizing the operating voltage.

The secondary current source 500 includes a switching element Q2 which provides a secondary current. The switching element Q2 may include an NMOS transistor. The secondary current source 500 may be configured to perform one or more of constant voltage control for the gate voltage of the switching element Q2 and current regulation for the secondary current outputted from the switching element Q2.

For this operation, the secondary current source 500 may include a switching element Q2, a gate control circuit, a constant voltage control circuit, a current regulation circuit, and a load.

The load may be installed at one or more of an input and an output of the switching element Q2, and include resistors R1 and R2. A secondary voltage obtained by lowering the rectified voltage may be formed in the load including the resistors R1 and R4.

The gate control circuit may include resistors R3 and R4 and an NPN bipolar transistor Q3. The NPN bipolar transistor Q3 is configured to receive the operating voltage of the current state through the base thereof, using the resistors R3 and R5.

More specifically, the operating voltage supplied to the additional device is sensed by the resistor R5, and the operating voltage sensed by the resistor R5 is divided by the resistor R3 and inputted to the base of the NPN bipolar transistor Q3. The NPN bipolar transistor Q3 controls the gate of the switching element Q2 in response to the operating voltage inputted to the base thereof, such that the operating voltage is retained by the secondary current outputted through the source of the switching element Q2.

The constant voltage control circuit may include a Zener diode Zd2, and the Zener diode Zd2 is connected to the gate of the switching element Q2, and prevents a predetermined level or more of voltage from being applied to the gate of the switching element Q2. That is, the Zener diode Zd2 regulates the maximum voltage applied to the gate of the switching element Q2.

The current regulation circuit may include an NPN bipolar transistor Q4. The NPN bipolar transistor Q4 has a base connected to the node between the switching element Q2 and the resistor R4. When the output current of the switching element Q2 is increased, the NPN bipolar transistor Q4 drops the gate voltage of the switching element Q2 by increasing the amount of current between the ground and the gate of the switching element Q2.

The driver 300 provides a current path corresponding to light emissions of the respective LED groups LED1 to LED4, and regulates a flow of driving current Id provided to the sensing resistor Rs in the current path. The driver 300 may control luminance by adjusting the amount of driving current Id in response to the dimming control signal DIM.

The LED groups LED1 to LED4 of the lighting unit 200 are sequentially turned on or off in response to changes of the rectified voltage.

When the rectified voltage rises to sequentially reach the light emission voltages of the respective LED groups LED1 to LED4, the driver 300 provides a current path corresponding to light emissions of the respective LED groups LED1 to LED4.

The light emission voltage V4 for controlling the LED group LED4 to emit light is defined as a voltage for controlling all of the LED groups LED1 to LED4 to emit light. The light emission voltage V3 for controlling the LED group LED3 to emit light is defined as a voltage for controlling the LED groups LED1 to LED3 to emit light. The light emitting voltage V2 for controlling the LED group LED2 to emit light is defined as a voltage for controlling the LED groups LED1 to LED2 to emit light. The light emission voltage V1 for controlling the LED group LED1 to emit light is defined as a voltage for controlling only the LED group LED1 to emit light.

Figure 2:
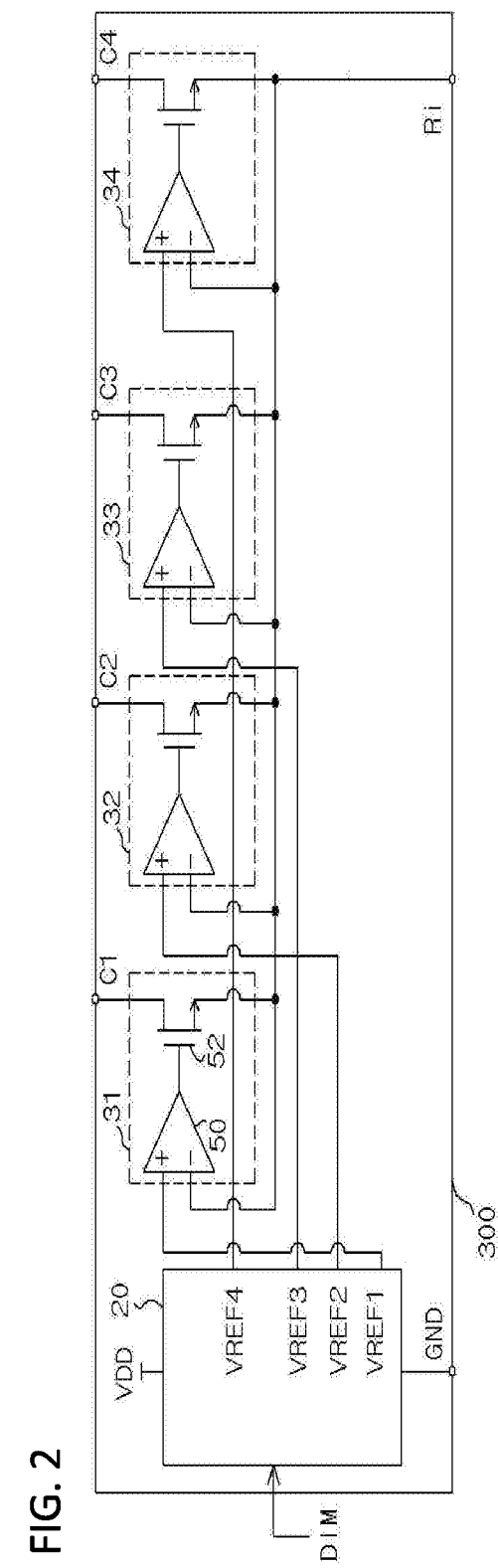
FIG. 2 is a detailed circuit diagram of a driver illustrated in FIG. 1.

As illustrated in FIG. 2, the driver 300 includes switching circuits 31 to 34 and a reference voltage supply unit 20. The switching circuits 31 to 34 provide a current path for the LED groups LED1 to LED4, and the reference voltage supply unit 20 provides the reference voltages VREF1 to VREF4.

The driver 300 may control luminance by adjusting the amount of driving current Id in the current path according to the dimming control signal DIM applied to the dimming terminal. For this operation, the driver 300 may be configured to control the levels of the entire reference voltages of the reference voltage supply unit 20 according to the dimming control signal DIM, or configured to control the operations of the switching circuits 31 to 34 according to the dimming control signal DIM. Since the configuration of the driver 300 for applying the dimming control signal DIM can be implemented in various manners, the detailed illustrations and descriptions thereof are omitted herein.

The reference voltage supply unit 20 may be configured to provide the reference voltages VREF1 to VREF4 having different levels according to a designer's intention.

The reference voltage supply unit 20 may include a plurality of resistors which are connected in series to each other so as to receive a constant voltage. The reference voltage supply unit 20 may be configured to output the reference voltages VREF1 to VREF4 having different levels through the nodes between the respective resistors. The reference voltage supply unit 20 may include independent voltage supply sources to provide the reference voltages VREF1 to VREF4 having different levels, unlike the above-described configuration. The reference voltage supply unit 20 shares the ground with the sensing resistor Rs. For the sharing operation, the reference voltage supply unit 20 is connected to the ground terminal GND.

Among the reference voltages VREF1 to VREF4 having different levels, the reference voltage VREF1 may have the lowest voltage level, and the reference voltage VREF4 may have the highest voltage level. The voltage level may gradually increase in order of the reference voltages VREF1, VREF2, VREF3, and VREF4.

The reference voltage VREF1 has a level for turning off the switching circuit 31 at the point of time that the LED group LED2 emits light. More specifically, the reference voltage VREF1 may be set to a lower level than the sensing voltage which is formed in response to light emission of the LED group LED2.

The reference voltage VREF2 may have a level for turning off the switching circuit 32 at the point of time that the LED group LED3 emits light. More specifically, the reference voltage VREF2 may be set to a lower level than the sensing voltage which is formed in response to light emission of the LED group LED3.

The reference voltage VREF3 has a level for turning off the switching circuit 33 at the point of time that the LED group LED4 emits light. More specifically, the reference voltage VREF3 may be set to a lower level than the sensing voltage which is formed in response to light emission of the LED group LED4.

The reference voltage VREF4 may be set to a higher level than the sensing voltage in the upper-limit level region of the rectified voltage.

The switching circuits 31 to 34 are commonly connected to the sensing resistor Rs through the sensing voltage Ri, in order to perform current regulation and form a current path.

The switching circuits 31 to 34 compare the sensing voltage of the sensing resistor Rs to the reference voltages VREF1 to VREF4 of the reference voltage supply unit 20, and form a current path corresponding to light emission of the lighting unit 200.

Each of the switching circuits 31 to 34 receives a high-level reference voltage as the switching circuit is connected to an LED group remote from the position to which the rectified voltage is applied.

Each of the switching circuits 31 to 34 may include a comparator 50 and a switching element, and the switching element may include an NMOS transistor 52.

The comparator 50 included in each of the switching circuits 31 to 34 has a positive input terminal (+) configured to receive a reference voltage, a negative input terminal (−) configured to receive a sensing voltage, and an output terminal configured to output a result obtained by comparing the reference voltage and the sensing voltage.

The NMOS transistor 52 included in each of the switching circuits 31 to 34 performs a switching operation for controlling a flow of driving current Id according to the output of the comparator 50, which is applied through the gate thereof.

Figure 3:
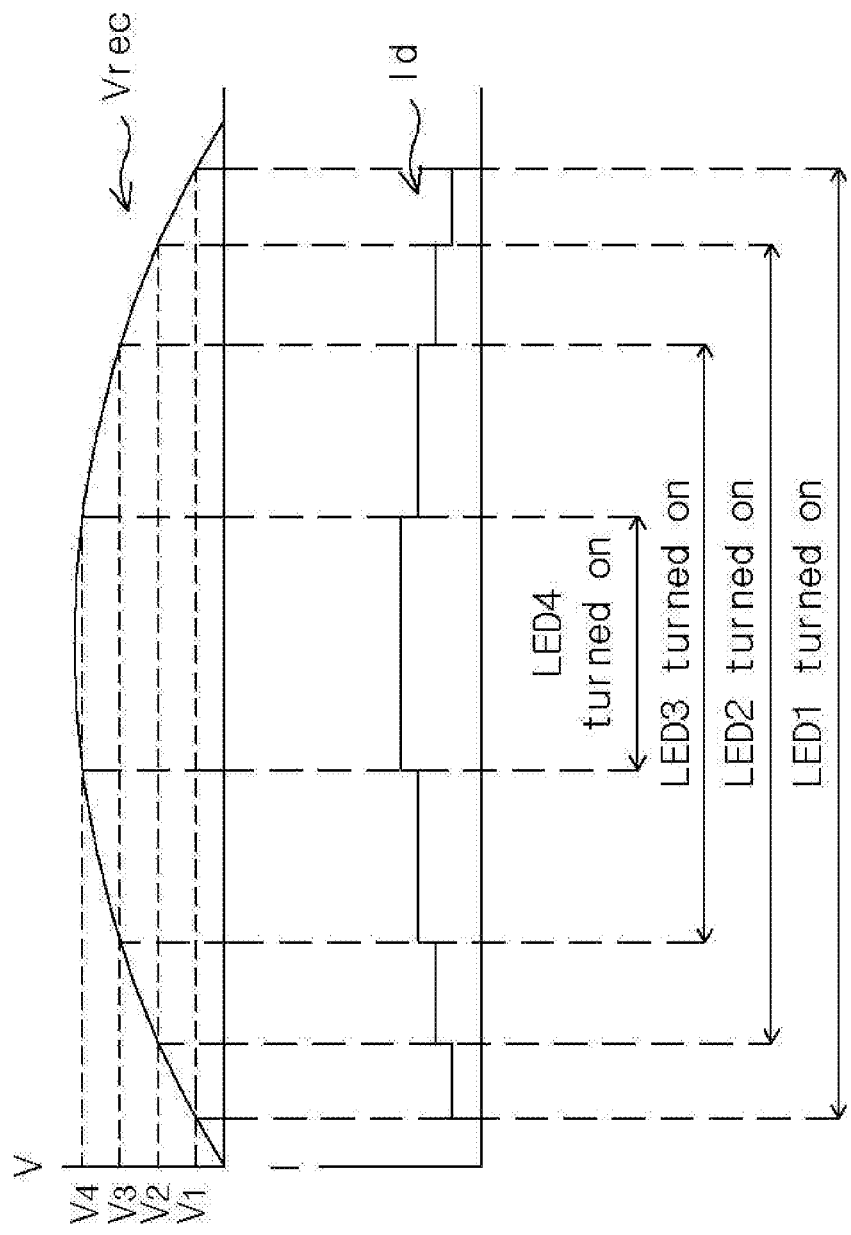
FIG. 3 is a waveform diagram for describing the operation of the control circuit illustrated in FIG. 1.

The operation of the control circuit according to the embodiment of the present invention will be described in more detail with reference to FIG. 3. For convenience of description, the operation of the control circuit is divided into the operation of providing a current path through the driver 300 and the charging operation by the primary current source 400 and the secondary current source 500.

First, the operation of changing the current path through the driver 300 according to the light emitting states of the LED1 to LED4, which are changed in response to changes of the rectified voltage Vrec, will be described.

When the rectified voltage Vrec is in the initial state, all of the switching circuits 31 to 34 maintain a turn-on state, because the reference voltages VREF1 to VREF4 applied to the positive input terminals (+) of the respective switching circuits 31 to 34 are higher than the current sensing voltage applied to the negative input terminals (−) of the respective switching circuits 31 to 34. At this time, the LED groups LED1 to LED4 are turned off.

Then, when the rectified voltage Vrec rises to reach the light emitting voltage V1, the LED group LED1 emits light. When the LED group LED1 emits light, the switching circuit 31 connected to the LED group LED1 provides a current path. That is, the current path is formed by the switching circuit 31.

When the LED group LED1 emits light, a flow of driving current ID begins in the current path formed by the switching circuit 31. At this time, however, since the level of the sensing voltage is low, the turn-on states of the switching circuits 31 to 34 are not changed.

Then, while the rectified voltage Vrec reaches the light emission voltage V2, the driving current Id is regulated to a predetermined amount through the regulation operation of the switching circuit 31.

Then, when the rectified voltage Vrec reaches the light emitting voltage V2, the LED group LED2 emits light. When the LED group LED2 emits light, the switching circuit 32 connected to the LED group LED2 provides a current path. At this time, the LED group LED1 also maintains the light emitting state.

When the LED group LED2 emits light, a flow of driving current Id begins in the current path formed by the switching circuit 32, and the sensing voltage at this time has a higher level than the reference voltage VREF1. Therefore, the NMOS transistor 52 of the switching circuit 31 is turned off by an output of the comparator 50. That is, the switching circuit 31 is turned off, and the switching circuit 32 provides a selective current path corresponding to the light emission of the LED group LED2.

Then, while the rectified voltage Vrec reaches the light emission voltage V3, the driving current Id is regulated to a predetermined amount through the regulation operation of the switching circuit 32.

When the rectified voltage Vrec reaches the light emission voltage V3, the LED group LED3 emits light. When the LED group LED3 emits light, the switching circuit 33 connected to the LED group LED3 provides a current path. At this time, the LED groups LED1 and LED2 also maintain the light emitting state.

When the LED group LED3 emits light, a flow of driving current Id begins in the current path formed by the switching circuit 33, and the sensing voltage at this time has a higher level than the reference voltage VREF2. Therefore, the NMOS transistor 52 of the switching circuit 32 is turned off by an output of the comparator 50. That is, the switching circuit 32 is turned off, and the switching circuit 33 provides a selective current path corresponding to the light emission of the LED group LED3.

Then, while the rectified voltage Vrec reaches the light emission voltage V4, the driving current Id is regulated to a predetermined amount through the regulation operation of the switching circuit 33.

Then, when the rectified voltage Vrec reaches the light emission voltage V4, the LED group LED4 emits light. When the LED group LED4 emits light, the switching circuit 34 connected to the LED group LED4 provides a current path. At this time, the LED groups LED1 to LED3 also maintain the light emitting state.

When the LED group LED4 emits light, a flow of driving current Id begins in the current path formed by the switching circuit 34, and the sensing voltage at this time has a higher level than the reference voltage VREF3. Therefore, the NMOS transistor 52 of the switching circuit 33 is turned off by an output of the comparator 50. That is, the switching circuit 33 is turned off, and the switching circuit 34 provides a selective current path corresponding to the light emission of the LED group LED4.

After rising to the upper limit level, the rectified voltage Vrec starts to fall.

Then, while the rectified voltage Vrec reaches the upper limit level, the driving current Id is regulated to a predetermined amount through the regulation operation of the switching circuit 34.

On the other hand, when the rectified voltage Vrec falls below the light emission voltages V4, V3, V2, and V1 in a stepwise manner from the upper limit level, the LED groups LED4 to LED1 are sequentially turned off. Furthermore, the driving current Id decreases in a stepwise manner in response to the turns-off of the LED groups LED4 to LED1.

As described above, the driver 300 may change and provide a current path in response to the light emitting states of the LED groups LED1 to LED4.

The control circuit of the LED lighting apparatus according to the embodiment of the present invention may charge the charging element Cv using the primary current source 400 and the secondary current source 500 and provide an operating voltage to the additional device, while changing and providing a current path in response to the changes of the light emitting states of the LED diode groups LED1 to LED4.

The charging operation according to the embodiment of the present invention will be described in detail.

First, the charging operation by the primary current source 400 will be described.

When the rectified voltage Vrec is changed at the light emission voltage V1 or more, the driver 300 provides a current path corresponding to light emission, and the driving current Id is passed through the current path. The driving current ID has a waveform which increases or decreases in a stepwise manner in response to the changes of the rectified voltage Vrec.

The driving current Id is passed to the output resistor Rc through the sensing resistor Rs, and a divided voltage is formed in the output resistor Rc by the driving current Id. As a result, the rectified voltage Vrec is divided by the driver 300, the sensing resistor Rs, and the output resistor Rc, and the divided voltage corresponding to the change of the rectified voltage Vrec is formed in the output resistor Rc.

Thus, the primary current by the divided voltage may be provided to the charging element Cv through a diode Ds, and the charging element Cv has a charge voltage by the primary current.

The charging element Cv is configured to have a charge voltage for supplying operating voltages of the microcomputer 600 and the wireless module 700 which are implemented as additional devices. Thus, the capacity of the charging element Cv may be set to such a level as to supply a constant voltage of 2V to 5V, which is required as the operating voltages of the additional devices such as the microcomputer 600 and the wireless module 700, and supply of the primary current in an over-current state to the charging element Cv may be controlled by the voltage retention circuit including the NPN bipolar transistor Q1, the Zener diode Zd1, and the resistor Rd.

In the voltage retention circuit, the voltage applied to the base of the NPN bipolar transistor Q1 is regulated by the Zener diode Zd1. Thus, the divided voltage of the output resistor Rc may be retained at a predetermined level or less, and the amount of primary current supplied to the charging element Cv may be controlled.

When the rectified voltage Vrec is changed below the light emission voltage V1, the LED groups LED1 to LED4 are turned off, and the driving current ID is not outputted from the driver 300. In this case, the primary current source 400 may not smoothly supply the primary current, and the charging element Cv may not be charged by the primary current.

When the rectified voltage Vrec is changed below the light emission voltage V1 as described above, the secondary current source 500 may supply a secondary current to the charging element Cv, and the charging element Cv may be charged by the secondary current. That is, the level of the operating voltage provided to the load may be lowered.

The secondary current source 500 determines when to supply the secondary current as the level of the operating voltage provided to the load. When the operating voltage is lowered to a predetermined level or less, the secondary current source 500 provides a secondary current to the charging element Cv in response to the level of the operating voltage.

When the rectified voltage Vrec is retained at the light emission voltage V1 or more, the operating voltage of the load is sufficiently high, the operating voltage being applied to the base of the NPN bipolar transistor Q3 through the resistor R5. Thus, the NPN bipolar transistor Q3 is turned on. As the NPN bipolar transistor Q3 is turned on, the gate voltage of the NMOS transistor Q2 is fixed to a low state. Thus, the NMOS transistor Q2 is turned off, and no secondary current is supplied to the charging element Cv.

When the rectified voltage Vrec falls below the light emission voltage V1, the operating voltage of the load is lowered, the operating voltage being applied to the base of the NPN bipolar transistor Q3 through the resistor R5. When the operating voltage of the load is lowered, the NPN bipolar transistor Q3 controls the amount of current in response to the operating voltage of the load, and the gate voltage of the NMOS transistor Q2 rises as the collector voltage of the NPN bipolar transistor Q3 is high. Then, the NMOS transistor Q2 may supply a rectified current corresponding to the rectified voltage as a secondary current in response to the change of the gate voltage. That is, the NMOS transistor Q2 starts supplying the secondary current. While the NPN bipolar transistor Q3 is controlled, the NMOS transistor Q2 may supply the rectified current as the secondary current according to the gate voltage applied through the resistor R2.

The current supply of the NMOS transistor Q2 may be controlled by the voltage regulation operation for regulating the gate voltage of the Zener diode Zd2 and the current regulation operation of the NPN bipolar transistor Q4.

The Zener diode Zd2 regulates the voltage applied to the gate of the NMOS transistor Q2 such that the voltage does not rise to a preset level or more. Thus, the amount of secondary current supplied by the NMOS transistor Q2 may be controlled.

Furthermore, when the rectified voltage Vrec is less than the light emission voltage V1, this state corresponds to a valley section at which the rectified voltage Vrec rises after falling to the lowest voltage level. The rectified current may have the initial transient characteristic at the point of time that the rectified voltage Vrec rises from the lowest point.

When the rectified current having the transient characteristic is generated, the NPN bipolar transistor Q4 may be operated by the voltage applied to the resistor R4, and the gate voltage of the NMOS transistor Q2 may be controlled by the operation of the NPN bipolar transistor Q4. That is, when the rectified current having the transient characteristic is generated, the transient characteristic is reflected into the secondary current outputted from the NMOS transistor Q2. Then, the gate voltage of the NMOS transistor Q2 is lowered by the operation of the NPN bipolar transistor Q4. As a result, the NPN bipolar transistor Q4 performs a current regulation operation corresponding to a rectified current having the transient characteristic, outputted from the NMOS transistor Q2, and the transient characteristic of the secondary current supplied from the NMOS transistor Q2 may be controlled by the current regulation of the NPN bipolar transistor Q4.

When the rectified voltage Vrec is equal to or more than the light emission voltage V1, the charging element Cv is charged by the primary current of the primary current source 400, and when the rectified voltage Vrec is less than the light emission voltage V1, the charging element Cv is charged by the secondary current of the secondary current source 500.

When the rectified voltage Vrec is equal to or more than the light emission voltage V1, the divided voltage formed in the primary current source 400 may be retained at more than the voltage formed by the secondary current source 500. This is in order to guarantee light emission efficiency by suppressing the introduction of the secondary current from the secondary current source 500, while light emission is performed.

As described above, the charging element Cv may maintain the state of charge, and the operating voltage of the additional device may be provided through the rectified voltage used for light emission. Thus, the power efficiency of the LED lighting apparatus can be improved, and the power consumption can be reduced.

Furthermore, even when the amount of driving current Id decreases, the charging element Cv can be subsidiarily charged by the rectified current. Thus, the charge voltage can be stably retained, and the operating voltage can be smoothly supplied to the additional device.

According to the embodiment of the present invention, the control circuit for an LED lighting apparatus can provide an operating voltage for an additional voltage using a rectified voltage used for light emission, thereby improving power efficiency and reducing power consumption.

Furthermore, the control circuit can supply an operating voltage for an additional device through a charging operation using a driving current outputted from the current path for light emission, and assist a charging operation using a rectified voltage when a driving current is reduced, thereby stably maintaining a charge voltage. Thus, the operating voltage can be smoothly supplied to the additional device.

While various embodiments have been described above, it will be understood to those skilled in the art that the embodiments described are by way of example only. Accordingly, the disclosure described herein should not be limited based on the described embodiments.

What is claimed is:

1. A control circuit for an LED lighting apparatus, which controls light emission of one or more LED groups in response to changes of a rectified voltage, the control circuit comprising:
   a driver configured to provide a current path corresponding to light emission of the one or more LED groups; and
   a primary current source configured to provide a primary current using a driving current outputted from the current path,
   wherein the control circuit provides an operating voltage to an additional device using the primary current.

2. The control circuit of claim 1, wherein the primary current source is connected in series to the current path so as to form a divided voltage corresponding to the driving current, and regulate the divided voltage to a predetermined voltage or less so as to provide the primary current.

3. The control circuit of claim 1, further comprising a charging element charged by the primary current, and configured to provide a ripple-reduced charge voltage to the additional device,
   the charge voltage is provided as the operating voltage.

4. The control circuit of claim 1, further comprising a secondary current source configured to provide a secondary current by the rectified voltage to the additional device when the operating voltage supplied to the additional device is lowered to a predetermined level or less.

5. The control circuit of claim 4, wherein the primary current source is connected in series to the current path so as to form a divided voltage corresponding to the driving current, and provides the primary current using the divided voltage, and
   the maximum value of the divided voltage regulated by the primary current source is set to be higher than a secondary voltage of the secondary current source which provides the secondary current.

6. The control circuit of claim 4, wherein the secondary current source comprises a switching element configured to provide the secondary current corresponding to the rectified voltage, and
the secondary current source provides the secondary current to the additional device through the switching element, based on determination through the operating voltage, and performs one or more of constant voltage control for a gate voltage of the switching element and current regulation for the secondary current provided from the switching element in order to provide the secondary current.

7. The control circuit of claim 4, wherein the secondary current source comprises:
   a switching element configured to provide the secondary current by the rectified current;
   a gate control circuit configured to control the level of the gate voltage of the switching element in response to the level of the operating voltage;
   a current regulation circuit configured to perform current regulation for the switching element by controlling the level of the gate voltage in response to the amount of secondary current provided from the switching element; and
   a load formed at an output of the switching element and configured to provide the secondary current to the additional device.

8. A control circuit for an LED lighting apparatus, which controls light emission of one or more LED groups in response to changes of a rectified voltage, the control circuit comprising:
   a driver configured to provide a current path corresponding to light emission of the one or more LED groups; and
   a current source configured to provide one or more of a primary current using a driving current outputted from the current path and a secondary current using a rectified voltage provided to the one or more LED groups,
   wherein the control circuit provides an operating voltage to an additional device, using one or more of the primary current and the secondary current which are provided from the current source.

9. The control circuit of claim 8, further comprising a charging element charged by the current source, and configured to provide a ripple-reduced charge voltage to the additional device,
   wherein the charge voltage is provided as the operating voltage.

10. The control circuit of claim 9, wherein the current source comprises:
    a primary current source connected in series to the current path to form a divided voltage by the dividing current, and configured to provide the primary current using the divided voltage; and
    a secondary current source configured to provide the secondary current using the rectified current provided to the one or more LED groups, based on determination through the operating voltage, and
    the maximum value of the divided voltage regulated by the primary current source is set to be higher than a secondary voltage of the secondary current source which provides the secondary current.

11. The control circuit of claim 10, wherein the primary current source regulates the divided voltage to a predetermined voltage or less.

12. The control circuit of claim 10, wherein the secondary current source comprises a switching element configured to provide the secondary current by the rectified voltage, and
    the secondary current source performs one or more of constant voltage control for a gate voltage of the switching element and current regulation for the current outputted from the switching element, and provides the secondary current.

13. A control circuit for an LED lighting apparatus, which controls light emission of one or more LED groups in response to changes of a rectified voltage, the control circuit comprising:
   a current path formed in response to light emission of the one or more LED groups; and
   a primary current source configured to provide a primary current using a driving current outputted from the current path,
   wherein the control circuit provides an operating voltage to an additional device, using the primary current.

14. The control circuit of claim 13, wherein the primary current source is connected in series to the current path so as to form a divided voltage corresponding to the driving current, and regulates the divided voltage to a predetermined voltage or less so as to provide the primary current.

15. The control circuit of claim 13, further comprising a charging element charged by the primary current, and configured to provide a ripple-reduced charge voltage to the additional device,
   wherein the charging voltage is provided as the operating voltage.

16. The control circuit of claim 13, further comprising a secondary current source configured to provide a secondary current by the rectified voltage to the additional device when the operating voltage supplied to the additional device is lowered to a predetermined level or less.

17. The control circuit of claim 16, wherein the primary current source is connected in series to the current path so as to form a divided voltage corresponding to the driving current, and provides the primary current using the divided voltage, and
   the maximum value of the divided voltage regulated by the primary current source is set to be higher than a secondary voltage of the secondary current source which provides the secondary current.

18. The control circuit of claim 16, wherein the secondary current source comprises a switching element configured to provide the secondary current corresponding to the rectified voltage, and
   the secondary current source provides the secondary current to the additional device through the switching element, based on determination through the operating voltage, and performs one or more of constant voltage control for a gate voltage of the switching element and current regulation for the secondary current provided from the switching element in order to provide the secondary current.

* * * * *